United States Patent
Bhoge et al.

(10) Patent No.: US 10,888,095 B2
(45) Date of Patent: Jan. 12, 2021

(54) STABLE HERBICIDAL COMPOSITIONS

(71) Applicant: UPL LIMITED, Haldia (IN)

(72) Inventors: Satish Ekanath Bhoge, Mumbai (IN); Paresh Vithaldas Talati, Mumbai (IN); Jaidev Rajnikant Shroff, Mumbai (IN); Vikram Rajnikant Shroff, Mumbai (IN)

(73) Assignee: UPL LIMITED, Haldia (IN)

( * ) Notice: Subject to any disclaimer, the term of this patent is extended or adjusted under 35 U.S.C. 154(b) by 0 days.

(21) Appl. No.: 15/115,553

(22) PCT Filed: Jan. 19, 2015

(86) PCT No.: PCT/IB2015/050383
§ 371 (c)(1),
(2) Date: Jul. 29, 2016

(87) PCT Pub. No.: WO2015/114483
PCT Pub. Date: Aug. 6, 2015

(65) Prior Publication Data
US 2017/0181434 A1    Jun. 29, 2017

(30) Foreign Application Priority Data
Feb. 3, 2014    (IN) .............................. 141/KOL/2014

(51) Int. Cl.
*A01N 57/20*    (2006.01)
*A01N 25/02*    (2006.01)
*B65D 81/32*    (2006.01)

(52) U.S. Cl.
CPC ............. *A01N 57/20* (2013.01); *A01N 25/02* (2013.01); *B65D 81/32* (2013.01)

(58) Field of Classification Search
None
See application file for complete search history.

(56) References Cited

U.S. PATENT DOCUMENTS

| | | | |
|---|---|---|---|
| 5,258,358 A | 11/1993 | Kocur et al. | |
| 5,491,125 A | 2/1996 | Albrecht et al. | |
| 2007/0184982 A1* | 8/2007 | Long | A01N 25/02 504/201 |
| 2011/0189294 A1* | 8/2011 | Keiper | A01N 25/04 424/489 |
| 2016/0120177 A1* | 5/2016 | Shroff | A01N 57/20 504/207 |

FOREIGN PATENT DOCUMENTS

| | | | | |
|---|---|---|---|---|
| CN | 101843262 A | * | 9/2010 | |
| JP | 07-089817 | | 4/1995 | |
| WO | WO1999027787 A1 | * | 6/1999 | ............. A01N 43/08 |
| WO | WO 2013098220 | | 7/2013 | |
| WO | WO 2014199293 | | 12/2014 | |

OTHER PUBLICATIONS

International Search Report and Written Opinion in PCT/IB2015/050383, dated Apr. 13, 2015.

* cited by examiner

*Primary Examiner* — Erin E Hirt
(74) *Attorney, Agent, or Firm* — Cantor Colburn LLP

(57) ABSTRACT

The present invention provides a temperature stable herbicidal composition comprising 2-amino-4-[hydroxy(methyl)phosphinoyl]butyric acid, its salts, its isomers, mixture of isomers, derivatives or their lower alkyl esters or salts thereof with acids or bases, ($C_8$-$C_{20}$) alkyldimethylamine N-oxide and an inorganic ammonium salt. Also provided is a process for preparing the composition by mixing said active ingredient in a formulation vessel with water and solvent followed by the addition of calculated amount of ($C_8$-$C_{20}$) alkyldimethylamine N-oxide and inorganic ammonium salt, and if required further customary adjuvants, solvents or other components such as wetting agent, coloring agent or defoamer followed by homogenizing the resultant mixture to obtain a clear solution. A method of weed control applying the composition of the present invention as well as a multipack herbicidal product comprising the composition are within the purview of the present invention.

13 Claims, No Drawings

STABLE HERBICIDAL COMPOSITIONS

TECHNICAL FIELD OF THE INVENTION

The present invention relates to an herbicidal composition particularly stable at lower temperatures. The present invention provides a stable herbicidal composition comprising an inorganic salt of 2-amino-4-[hydroxy(methyl)phosphinoyl] butyric acid, ($C_8$-$C_{20}$)alkyldimethylamine N-oxide and an inorganic ammonium salt exhibiting excellent stability at low temperatures.

BACKGROUND OF THE INVENTION

Stability of the pesticidal formulation, particularly low temperature stability of the formulation has been of great concern when they are exposed to various changing weather conditions. The stability of a formulated product may be influenced by many factors and is one very important factor in determining the efficacy of the formulation. The formulations may undergo both physical and chemical changes depending upon the environment they are exposed to. Since many pesticides are for global market, the variability of climatic conditions under which the formulations are likely to be stored has to be taken into account while developing new pesticide formulations. Low temperature stability is of particular importance for liquid based formulations when they need to be used or exposed in colder regions. Precipitation of active substance and/or surfactants as well as freezing of formulations during storage in low temperature climatic regions will lead to practical difficulties in handling the product and improper mixing in the tank which will result in poor bioefficacy.

In view of the fact that adjuvants play a major role in determining the properties of a formulation as well as in enhancing the activity of the active ingredients, choice of suitable adjuvants is critical in deciding the bio-efficacy of a particular formulation. Considering the environmental concerns and stringent regulatory requirements, smarter way for agrochemical formulators to move forward is to use better specific adjuvants and to reduce the volume of organic solvents. However it remains as a challenge to address the issues associated with parameters such as stability, solubility, compatibility, foam, suspension, spreadability penetration etc. Though specific adjuvants have been developed to address these concerns, development of stable formulations incorporating these adjuvants remains as a challenge.

U.S. Pat. No. 3,527,593 discloses use of amine oxide as wetting agent in herbicidal compositions containing herbicides.

U.S. Pat. No. 4,168,963 discloses 2-amino-4-[hydroxy (methyl)phosphinoyl]butyric acid (referred to as glufosinate herein after), its salts, its isomers, and their derivatives including salts, possess a good and broad activity against weeds of many botanical families. The L-enantiomer of glufosinate is regarded as being the biologically active isomer. The ammonium salt of these compounds is particularly important. They are usually formulated as aqueous solutions.

As water soluble active ingredients such as glufosinate ammonium is preferably formulated as aqueous solutions, solidification of formulation may happen at lower temperatures, especially with high concentration of the active ingredient and adjuvants.

U.S. Pat. No. 5,491,125 discloses liquid herbicidal compositions of Glufosinate. The patent discloses use of several classes of surfactants which may be used to formulate glufosinate in its salt form. The surfactants include non-ionic, anionic and a combination of non-ionic and/or anionic surfactants.

Further it has been disclosed in U.S. Pat. No. 5,491,125 that the activity of these compounds can be effectively improved by the addition of surface active agents many of which are available in the art.

However, most of the formulations prepared in the examples in the specification of U.S. Pat. No. 5,491,125 using these surfactants result in either a cloudy formulation, or there is a solid separation or crystal formation at temperature below 0° C.

It can therefore be concluded that although glufosinate can be combined with the surfactants mentioned in U.S. Pat. No. 5,491,125, a stable formulation which is stable at temperature below 0° C. cannot be prepared and practiced in the field where the temperatures are below 0° C.

It is understood that when the active ingredients and/or adjuvants are solids at room temperature, at lower temperatures, their aqueous formulations have the tendency for crystallisation of the solids present in it. This is more so when the concentrations of the active ingredient and/or adjuvants are on higher side, that is more than 30% of the weight of the formulation. Such formulations when stored under cooler climatic conditions, require further warming up of the formulation to make it homogenous to enable further use. These procedures are often unsafe and may affect the bio-efficacy of the product. There can be uneven phase resulting in uneven distribution of the active ingredient and the surfactant resulting into uneven, inadequate and often insufficient application of the active ingredient resulting into ineffectiveness of formulation.

Therefore, there is a need in the art for stable compositions; in particular, compositions stable at low temperatures, especially at sub-zero temperatures, while maintaining the bio-efficacy of the formulations.

OBJECTS OF THE INVENTION

It is an object of the present invention to provide a herbicidal composition comprising glufosinate which is stable at low temperatures.

It is another object of the present invention to provide a liquid herbicidal composition comprising glufosinate which is stable at low temperatures.

Another object of the present invention is to provide a process for a herbicidal composition comprising glufosinate which is stable at low temperatures.

It is a further object of the present invention to provide a herbicidal composition comprising glufosinate with lower amount of organic solvents.

Yet another object of the invention is to provide a herbicidal composition comprising glufosinate which is bioefficacious.

Another object of the invention is to provide a herbicidal composition comprising glufosinate which can be used at low temperature.

SUMMARY OF THE INVENTION

The present invention provides a low temperature stable herbicidal composition comprising 2-amino-4-[hydroxy (methyl)phosphinoyl]butyric acid, its salts, its isomers, mixture of isomers, derivatives or their lower alkyl esters or salts thereof with acids or bases, ($C_8$-$C_{20}$)alkyldimethylamine N-oxide and an inorganic ammonium salt.

Further there is provided a process for preparation of a low temperature stable herbicidal composition comprising 2-amino-4-[hydroxy(methyl)phosphinoyl]butyric acid, its salts, its isomers, mixture of isomers, derivatives or their lower alkyl esters or salts thereof with acids or bases, ($C_8$-$C_{20}$)alkyldimethylamine N-oxide and an inorganic ammonium salt.

In another aspect there is provided a method of using a composition comprising 2-amino-4-[hydroxy(methyl)phosphinoyl]butyric acid, its salts, its isomers, mixture of isomers, derivatives or their lower alkyl esters or salts thereof with acids or bases, ($C_8$-$C_{20}$)alkyldimethylamine N-oxide and an inorganic ammonium salt which is stable at low temperature for effectively controlling the undesired weed species.

DETAILED DESCRIPTION

Present invention is related to a herbicidal composition comprising glufosinate which demonstrates excellent stability at low temperature and is bioefficacious. The present invention particularly relates to a liquid composition comprising glufosinate which is stable at temperatures below 0° C. even with high loading of the active ingredient/s and/or adjuvant/s.

U.S. Pat. No. 5,491,125 (to Albrecht) discloses liquid herbicidal formulations of glufosinate wherein variety of surfactants have been disclosed which can be used in the formulation. However, the formulations suffer from the drawback of low temperature stability. The formulations are either cloudy or have crystal formation or have solid separation when they are tested for stability at temperature below 0° C. Although the formulations are said to be bioefficacious in controlling weed, they are not practicable due to low temperature instability.

Surprisingly, inventors of the present invention found out that the problem of low temperature stability of glufosinate composition can be overcome by using adjuvants wherein the adjuvants comprises a ($C_8$-$C_{20}$)alkyldimethylamine N-oxide and an inorganic ammonium salt.

Ammonium sulfate is known as a tank mix adjuvant for herbicides.

Such combination of a ($C_8$-$C_{20}$)alkyldimethylamine N-oxide and an inorganic ammonium salt to arrive at a composition which is stable at low temperature, is not known in the art.

Further, inventors of the present invention observed that aqueous glufosinate salt composition with excellent stability at low temperatures prepared by using the careful combination of a ($C_8$-$C_{20}$)alkyldimethylamine N-oxide, an inorganic ammonium salt also demonstrate better bio efficacy. A combination of the adjuvants of the present invention being found effective with a high load of active ingredient achieving excellent stability and bio-efficacy is surprising, in view of the known and identified fact that high concentrations of adjuvants are required in order to obtain effective weed control while using a glufosinate formulation. The composition according to the present invention was found to be highly effective in controlling weeds.

The present invention provides a low temperature stable herbicidal composition comprising 2-amino-4-[hydroxy(methyl)phosphinoyl]butyric acid, its salts, its isomers, mixture of isomers, derivatives, or their lower alkyl esters thereof or salts thereof with acids or bases, ($C_8$-$C_{20}$)alkyldimethylamine N-oxide and an inorganic ammonium salt.

In an embodiment of the present invention the composition comprises 2-amino-4-[hydroxy(methyl)phosphinoyl] butyric acid, its salts, its isomers, mixture of isomers, derivatives, or their lower alkyl esters thereof or salts thereof with acids or bases preferably the racemate or its salts as the active ingredient.

According to an embodiment of the present invention, the active ingredient may be selected from glufosinate, lower alkyl esters thereof or salts thereof with acids or bases such as its hydrochloride, monosodium salt, disodium salt, monopotassium salt, dipotassium salt, monocalcium salt, ammonium salt, —$NH_3(CH_3)^+$ salt, —$NH_2(CH_3)_2^+$ salt, —$NH(CH_3)_3^+$ salt, —$NH(CH_3)_2(C_2H_4OH)^+$, —$NH_2(CH_3)(C_2H_4OH)^+$, or its methyl ester, ethyl ester, propyl ester or butyl ester.

According to another embodiment of the present invention, the active ingredient is glufosinate ammonium salt.

According to an embodiment of the present invention, the composition comprises from about 1% to about 50% by weight of glufosinate salt, between 5-50% by weight of the composition.

In an embodiment ($C_8$-$C_{20}$)alkyldimethylamine N-oxide is the adjuvant to be used in the present invention wherein, the nitrogen atom of the amine oxide bears at least one long chain aliphatic group having from 8 to 20 carbon atoms. Examples of ($C_8$-$C_{20}$)alkyldimethylamine N-oxide include decyl-, dodecyl, tetradecyl-, pentadecyl-, and hexadecyl and octadecyl dimethyl amine N-oxides. The preferred amine N-oxides are tetradecyldimethylamine N-oxide which also referred to as Myristyldimethyl amine N-Oxide and dodecyldimethylamine N-oxide which also referred to as Lauryl dimethylamine N-oxide.

According to a another embodiment of the present invention, the composition may contain from about 1% to about 35% by weight of ($C_8$-$C_{20}$)alkyldimethylamine N-oxide, more preferably it is from about 8% to about 30% by weight of the composition.

In an embodiment of the present invention the inorganic ammonium salt is selected from salts such as ammonium sulfate, ammonium chloride, ammonium bromide, ammonium nitrate and ammonium nitrite.

According to a preferred embodiment the inorganic ammonium salt is ammonium sulfate.

According to another embodiment of the present invention, the composition may contain from about 0.1% to about 10% by weight of inorganic ammonium salt more preferably it is from about 1% to about 7% by weight of the composition.

In an embodiment of the present invention, the composition further comprises one or more organic solvents.

According to another embodiment of the present invention, the solvents may be selected from but are not limited to: a water miscible polar/non-polar or a water immiscible polar/non-polar solvent, for example; alkyl esters of phthalic acid and trimellitic acid; aromatic hydrocarbons such as xylene, solvesso-100, solvesso-150, solvesso-200, alkyl benzenes; methylnaphthalene; mixtures of aromatics aliphatic or cycloaliphatic hydrocarbon such as hexane and heptanes; phthalates; ketones such as cyclohexanone, 2-octanone or acetophenone, methyl isobutyl ketone-saturated or unsaturated cyclic ketones such as isophorone, chlorinated hydrocarbons; vegetable oils and modified vegetable oils; glycols and their derivatives; aliphatic alcohols, alkoxy aliphatic alcohols or mixtures of such two or more solvents. Other solvents can be alkylene carbonates (like propylene carbonate), alkyl amides, and esters such as alkyl esters of monocarboxylic acids and dicarboxylic acid, ester-amides, cyclic ethers such furan and its derivatives or mixtures thereof.

In an embodiment of the present invention, the organic solvent is selected from glycols and their derivatives, aliphatic alcohols, alkoxy aliphatic alcohols or mixtures of such two or more solvents.

In another embodiment of the present invention, the organic solvent is selected from glycols and/or alkoxy alcohols.

In an embodiment of the present invention the composition comprises from about 1% to about 40% by weight of water miscible polar solvents, preferably it is from about 5% to about 20% by weight of the composition.

According to an embodiment of the present invention, low temperature refers to temperature below 10° C., preferably it is below 5° C. and more preferably it is 0° C. and below 0° C.

According to an embodiment of the present invention, the composition may comprise along with glufosinate or its salts other active ingredients selected from various classes of pesticides including fungicides, insecticides and herbicides, preferably with herbicides and mixtures thereof.

According to another embodiment of the present invention, the actives may be preferably water soluble or water insoluble herbicide selected from: Diphenyl ether herbicides such as oxyfluorfen, acifluorfen and its salts, lactofen and its salts, fomesafen and its salts; Pyrimidinyloxybenzoic analogue herbicides such as pyrithiobac sodium, bispyribac sodium; Organophosphrous based herbicides such as glyphosate and its salts, bilanafos and its salts, bialaphos and its salts; Bipyridinium herbicides such as paraquat and diquat and salts thereof; aryloxyalkanoic acid herbicides such as 2, 4-D and its salts and esters, MCPA, MCPB and their salts; aryloxyphenoxypropionic herbicides such as haloxyfop, isomers and esters, clodinafop and its esters; Pyridine herbicides such as triclopyr, picloram, aminopyralid and salts thereof; Aromatic herbicides such as dicamba, 2,3,6-TBA, tricamba and their salts; Pyridinecarboxylic acid herbicides such as clopyralid; Imidazolinones selected from imazameth, imazamethabenz, imazamox, imazapic, imazapyr, imazaquin, imazethapyr; herbicides such as sulfonyl urea herbicides such as flazasulfuron, rimsulfuron, bensulfuron, ethoxysulfuron, mesosulfuron, oxasulfuron, pyrazosurfuron-ethyl and their salts; cyclohexanedioneoxime herbicides such as clethodim and its salts, chloroacetamide herbicide such as metolachlor and its salts and isomers, phenyl phthalimide herbicides such as flumioxazin and its salts, mesotrione, dinitroaniline herbicides such as oryzalin, pendimethalin, profluralin, trifluralin and its salts, bicyclic dicarboxylic acid herbicides such as endothal and its salts or mixtures of such herbicides.

According to an embodiment of the present invention the composition comprising more than one active ingredient may be formulated in suitable ways, not limiting to soluble concentrate, suspension concentrate or emulsions oil-in-water or water-in-oil, micro emulsions and suspo-emulsions.

The processes for preparing such formulations are known in the art and are not particularly limiting.

In an embodiment of the present invention there is provided a process for preparation of a low temperature stable herbicidal composition comprising 2-amino-4-[hydroxy (methyl)phosphinoyl]butyric acid, its salts, its isomers, mixture of isomers, derivatives, lower alkyl esters thereof or salts thereof with acids or bases, $(C_8-C_{20})$alkyldimethylamine N-oxide and an inorganic ammonium salt.

According to another embodiment of the present invention there is provided a process for preparation of stable herbicidal composition wherein said process comprises mixing glufosinate ammonium in a formulation vessel with water and solvent followed by the addition of calculated amount of $(C_8-C_{20})$alkyldimethylamine N-oxide and inorganic ammonium salt, and if required further customary adjuvants, solvents or other components such as wetting agent, coloring agent or defoamer followed by homogenizing the resultant mixture to obtain a clear solution.

The glufosinate composition according to the present invention may further comprise other agronomically suitable excipients such as surfactants, solvent, fertilizer, pH modifiers, crystallization inhibitors, viscosity modifiers, suspending agents, spray droplet modifiers, pigments, antioxidants, foaming agents, light-blocking agents, compatibilizing agents, antifoam agents, sequestering agents, neutralizing agents, corrosion inhibitors, dyes, odorants, spreading agents, penetration aids, micronutrients, emollients, lubricants, sticking agents, dispersing agents, thickening agents, freezing point depressants, antimicrobial agents, and the like.

In an embodiment of the present invention, the surfactants may be selected from anionic, cationic or zwitterionic and/or nonionic surface active compounds (surfactants). Examples of anionic surfactants include: anionic derivatives of fatty alcohols having 10-24 carbon atoms in the form of ether carboxylates, sulfonates, sulfates, and phosphates, and their inorganic salts (e.g., alkali metal and alkaline earth metal salts) and organic salts (e.g., salts based on amine or alkanolamine); anionic derivatives of copolymers consisting of EO (ethylene oxide), PO (propylene oxide) and/or BO (butylene oxide) units, in the form of ether carboxylates, sulfonates, sulfates, and phosphates, and their inorganic salts (e.g., alkali metal and alkaline earth metal salts) and organic salts (e.g., salts based on amine or alkanolamine); derivatives of alkylene oxide adducts of alcohols, in the form of ether carboxylates, sulfonates, sulfates and phosphates, and their inorganic salts (e.g., alkali metal and alkaline earth metal salts) and organic salts (e.g., salts based on amine or alkanolamine); derivatives of fatty acid alkoxylates, in the form of ether carboxylates, sulfonates, sulfates and phosphates, and their inorganic salts (e.g., alkali metal and alkaline earth metal salts) and organic salts (e.g., salts based on amine or alkanolamine).

Examples of cationic orzwitterionic surfactants may be selected from alkylene oxide adducts of fatty amines, quaternary ammonium compounds having 8 to 22 carbon atoms (C8-C22), surface-active zwitterionic compounds such as taurides, betaines and sulfobetaines.

Examples of nonionic surfactants are: fatty alcohols having 10-24 carbon atoms with 0-60 EO and/or 0-20 PO and/or 0-15 BO in any order; fatty acid alkoxylates and triglyceride alkoxylates; fatty acid amide alkoxylates; alkylene oxide adducts of alkynediols; sugar derivatives such as amino sugars and amido sugars; polyacrylic and polymethacrylic derivatives; polyamides such as modified gelatins or derivatized polyaspartic acid; surfactant polyvinyl compounds such as modified PVP; polyol-based alkylene oxide adducts; polyglycerides and derivatives thereof.

Nonionic surfactants may be selected from the group of the alkylpolyglycosides.

The anti-foaming agents may be selected from, but are not limited to silicon based and non-silicone based agents. The silicone based agents may be selected from silicone oil, polydimethylsiloxane modified siloxane, and the non-silicone based agents may be selected from mineral oil based antifoams, vegetable oils, fatty acidsand its derivatives, fatty amines and its derivatives, fatty acid amides, substituted fatty acid amides and its derivatives, polyalkylene glycol and tributyl phosphate.

The colouring agents maybe selected from various formulation dyes known in the art.

The composition according to the present invention may be tank-mixed with other actives or alternatively may be sold as a kit of parts containing actives and adjuvants that may be mixed prior to spraying or a ready mix kit of parts containing premixed compositions of the adjuvants and actives described above.

In an embodiment of the multi-pack herbicidal product, the adjuvants can be contained in a separate container.

Preferably, when the adjuvants are contained in a separate container, the multi-pack herbicidal product includes an instruction manual instructing the user to admix the adjuvants with the active ingredient.

According to another embodiment, the multi-pack product optionally comprises containers containing other agents selected from other active ingredients and/or agrochemical adjuvants/surfactants that may be mixed prior to spraying.

Accordingly, in a preferred embodiment, the present invention provides a multi-pack herbicidal product comprising:

a) a first container containing 2-amino-4-[hydroxy (methyl)phosphinoyl]butyric acid, its salts, its isomers, mixture of isomers, derivatives, lower alkyl esters thereof or salts thereof with acids or bases as an active agrochemical ingredient;

b) a second container containing a ($C_8$-$C_{20}$)alkyldimethyl amine N-oxide and an inorganic ammonium salt;

c) optionally a third container containing other agrochemical adjuvants/surfactants/solvents; and d) an instruction manual instructing an user to admix said ingredients before application.

To prepare a composition according to the present invention, the active ingredient is mixed in a formulation vessel with water and solvent followed by the addition of calculated amount of ($C_8$-$C_{20}$)alkyldimethylamine N-oxide and ammonium sulfate. If required further customary adjuvants, solvents or other components such as wetting agent, coloring agent or defoamer can be added. The resultant mixture is homogenized to obtain a clear transparent solution. The formulation obtained is clear and no phase separation is observed at 54° C., 25° C., 14° C. and 0° C. after 7/14 days as per CIPAC guidelines (MT 39.3), indicating that the composition is stable. Sub-zero stability test has been done by keeping samples at −5° C. for 14 days.

Inventors of the present invention succeeded in inventing a stable composition by the careful combination of glufosinate or its salts with a ($C_8$-$C_{20}$)alkyldimethylamine N-oxide such as Myristyl dimethyl amine N-Oxide or Lauryl dimethylamine N-oxide, an inorganic ammonium salt such as ammonium sulfate and combination of solvents such as glycols and alkoxy alcohols. The optimum concentration of the adjuvants as well as solvents which led to a stable composition has been arrived at by the experiments as exemplified below.

EXAMPLES

Example 1

A composition of glufosinate ammonium (280 g/l) according the present invention was prepared as follows:

TABLE 1

| Ingredients | %(w/w) |
| --- | --- |
| Glufosinate Ammonium | 26 |
| 1-Methoxy-2-propnaol | 8.0 |
| Propylene Glycol | 10.0 |
| Myristyl dimethyl amine N-Oxide | 20.0 |
| Ammonium sulfate | 3.0 |
| Alkylamine ethoxylate | 0.50 |
| water | 32.5 |

Example 2

A composition of glufosinate ammonium (150 g/l) according the present invention was prepared as follows:

TABLE 2

| Ingredients | %(w/w) |
| --- | --- |
| Glufosinate Ammonium | 14.20 |
| 1-Methoxy-2-propnaol | 10.0 |
| Propylene Glycol | 15.0 |
| Myristyl dimethyl amine N-Oxide | 18.0 |
| Ammonium sulfate | 5.0 |
| Alkylamine ethoxylate | 0.50 |
| Antimussol 3470FL | 0.60 |
| water | 36.7 |

The compositions were prepared by in the following manner:

a. Glufosinate ammonium was mixed in a formulation vessel with water, propylene glycol followed by the addition of 1-methoxy-2-propanol, Myristyldimethyl amine N-oxide, ammonium sulfate and other excipient such as alkylamine ethoxylate and/or defoamer in required quantities one after the other. The resultant mixture was homogenized to obtain a clear transparent solution.

b. Optionally the pH of the solution was adjusted to obtain a pH stable composition which was then filtered to remove solid impurities.

The compositions obtained were clear and no phase separation occurred at 54° C., 25° C., 14° C., 0° C. and −5° C. after 7/14 days indicating that the compositions were stable at all ranges of temperature.

The sample details and stability data of the compositions prepared according to the present invention is illustrated in Table 3 and 4.

TABLE 3

Sample details

| Composition sample number | Active ingredient | (% by wt.) | Solvents X:Y (% by wt.) | Alkyl dimethylamine N-oxide (% by wt.) | Ammonium sulfate (% by wt.) |
|---|---|---|---|---|---|
| 1 | A | 11.88 | 12:7 | 8[a] | 7 |
| 2 | A | 11.88 | 16:10 | 20 | 7 |
| 3 | A | 24.7 | 9:4 | 20[a] | 4 |
| 4 | A | 14.16 | 9:8 | 10[a] | 1 |
| 5 | A | 14.16 | 16:10 | 22 | 7 |
| 6 | A | 24.5 | 9:8 | 23[a] | 5 |
| 7 | A | 24.5 | 15:12 | 26[a] | 6 |
| 8 | A | 24.7 | 15:8 | 20[a] | 5 |
| 9 | A | 24.7 | 13:8 | 22[a] | 5 |
| 10 | A | 24.7 | 11:8 | 24[a] | 5 |
| 11 | A | 24.5 | 15:8 | 20[b] | 5 |
| 12 | A | 25.0 | 10:8 | 24[b] | 5 |
| 13 | A:B | 29.4:31 | 4:1 | 24[b] | 1 |
| 14 | A:B | 29.4:31 | 3:2 | 22[b] | 2 |
| 15 | A:B | 29.4:31 | 2:2 | 20[b] | 3 |
| 16 U.S. Pat. No. 5,491,125 | A | 18 | 10:0 | 20[b] | 0 |
| 17 | A | 24.5 | 10:8 | 25[b] | 0 |
| 18 | A | 24.5 | 15:8 | 0 | 5 |
| 19 | A | 24.5 | 10:8 | 0 | 0 |

A: glufosinate ammonium,
B: glyphosate isopropyl amine salt,
X: propylene glycol,
Y: 1-methoxy-2-propanol,
[a] myristyl dimethyl amine oxide,
[b] lauryl dimethyl amine oxide

TABLE 4

Stability of the compositions

| Composition sample number | Appearance at 25° C. after 14 days | Appearance at 0° C. after 14 days | Appearance at −5° C. after 14 days |
|---|---|---|---|
| 1 | Clear | Clear | Clear |
| 2 | Clear | Clear | Clear |
| 3 | Clear | Clear | Clear |
| 4 | Clear | Clear | Clear |
| 5 | Clear | Clear | Clear |
| 6 | Clear | Clear | Clear |
| 7 | Clear | Clear | Clear |
| 8 | Clear | Clear | Clear |
| 9 | Clear | Clear | Clear |
| 10 | Clear | Clear | Clear |
| 11 | Clear | Clear | Clear |
| 12 | Clear | Clear | Clear |
| 13 | Clear | Clear | Clear |
| 14 | Clear | Clear | Clear |
| 15 | Clear | Clear | Clear |
| 16 | Clear | Clear | Cloudy |
| 17 | Clear | Clear | Hazy |
| 18 | Clear | Clear | Clear |
| 19 | Clear | Clear | Clear |

It can be seen from the table, sample 16 (prepared according to Formulation 1 of U.S. Pat. No. 5,491,125) and 17, where the adjuvant load is high, absence of ammonium sulfate leads to cloudy and hazy solution at low temperature indicating that the composition is not stable at low temperature.

Samples 1-15 of the present invention were prepared using active ingredients at varied concentrations, varied concentration and ratio of solvents as well as different alkyldimethylamine oxides and ammonium sulfate at varied concentration. It has been found that all these samples resulted in stable compositions at 25° C., 0° C. and −5° C. after 14 days.

Thus it has been found that the combination of adjuvants according to the present invention lead to a stable formulation which undergoes no chemical and physical changes on storage at low temperatures and also easy to handle for further use.

Field Trial:

Field trials were carried out using the compositions of glufosinate ammonium prepared according to the present invention as the broad spectrum herbicide. The compositions were diluted with water and optionally with other tank mix auxiliaries and applied at a water application rate of 300-500l/ha to crop and non-crop land containing many broad leave weeds, grasses and sedges.

At a dose of 3.245 L/ha after treatment using compositions of glufosinate ammonium prepared according to the present invention, chlorosis followed by necrosis of the weeds were observed demonstrating the bio-efficacy of the new compositions. The observations at 7 days, 14 days, 21 days, 45 days and 60 days after application were summarized in below tables.

In the field trial, sample 9 prepared according to the present invention was tested and compared against sample 16, 18 and 19 in broad leaf weeds for weed control efficacy. Results are shown in Table 5.

TABLE 5

% weed control 14 days after application

| | % Weed control | |
|---|---|---|
| Sample No. | Alternentherasessilis | Partheniumhysterophorus |
| Sample 9 | 79.60 | 80.90 |
| Sample 16 | 68.90 | 60.0 |
| Sample 18 | 48.00 | 45.00 |
| Sample 19 | 43.00 | 41.00 |

From the above result it was thus found that the samples of glufosinate ammonium prepared according to the present invention exhibited good weed control when compared with other samples. It has been noted that sample 16 led to an unstable composition and was found to be unsatisfactory in imparting effective weed control. It was also noted that the bioefficacy was very poor for samples 18 and 19 which did not have ($C_8$-$C_{20}$)alkyldimethylamine N-oxide and/or ammonium sulfate, though the compositions were stable.

The efficacy of the compositions according to the present invention was compared with a sample prepared as per example 11 of US 2005/0266999 (comparative sample)

Sample 10 corresponds to 280 g/L of the glufosinate ammonium composition and was tested against the comparative sample of 280 g/L of glufosinate ammonium.

Sample 5 corresponds to 150 g/L of the glufosinate ammonium composition and was tested against the comparative sample of 150 g/L of glufosinate ammonium.

TABLE 6

% weed control 7 days after application

| | BLWs | | | | Grasses | | | |
|---|---|---|---|---|---|---|---|---|
| Treatment | Commelina spp. | Acalypha spp. | Parthenium hysterophorus | Other BLW's | Echinocloa spp. | Digiteria spp. | Cynodon dactylon | Others |
| Sample 10 | 30 | 38 | 29 | 30 | 28 | 39 | 27 | 29 |
| Comparative sample | 19 | 25 | 28 | 20 | 18 | 28 | 25 | 22 |

TABLE 7

% weed control 21 days after application

| | BLWs | | | | Grasses | | | |
|---|---|---|---|---|---|---|---|---|
| Treatment | Commelina spp. | Acalypha spp. | Parthenium hysterophorus | Other BLW's | Echinocloa spp. | Digiteria spp. | Cynodon dactylon | Others |
| Sample 10 | 47 | 48 | 50 | 37 | 48 | 45 | 46 | 50 |
| Comparative sample | 33 | 35 | 43 | 45 | 35 | 50 | 38 | 30 |

TABLE 8

% weed control 45 days after application

| | BLWs | | | | Grasses | | | |
|---|---|---|---|---|---|---|---|---|
| Treatment | Commelina spp. | Acalypha spp. | Parthenium hysterophorus | Other BLW's | Echinocloa spp. | Digiteria spp. | Cynodon dactylon | Others |
| Sample 10 | 70 | 69 | 68 | 60 | 70 | 70 | 67 | 60 |
| Comparative sample | 55 | 58 | 56 | 50 | 54 | 54 | 49 | 40 |

TABLE 9

% weed control 60 days after application

| | BLWs | | | | Grasses | | | |
|---|---|---|---|---|---|---|---|---|
| Treatment | Commelina spp. | Acalypha spp. | Parthenium hysterophorus | Other BLW's | Echinocloa spp. | Digiteria spp. | Cynodon dactylon | Others |
| Sample 10 | 80 | 80 | 69 | 78 | 88 | 90 | 80 | 70 |
| Comparative sample | 55 | 66 | 56 | 54 | 65 | 66 | 56 | 53 |

It was thus found that the samples of glufosinate ammonium prepared according to the present invention exhibited good weed control when compared with the comparative sample. It was further noted that the compositions according to the present invention was effective for variety of weeds and consistent and very effective weed control was observed even after 60 days of treatment while in the case of the comparative sample, though a comparable control was observed in the initial days, weak weed control was observed after 60 days of application. Interestingly, weed control using formulations of the present invention showed significant and enhanced weed control after 45 days which was consistent even after 60 days when compared with the comparative sample. Thus a persistent and long term weed control (residual weed control) on a variety of weeds has been achieved using the formulations according to the present invention.

In another field trial, sample 5 which corresponds to 150 g/l of the active ingredient was tested for burn-down effect against the comparison sample containing 150 g/l of glufosinate ammonium. Results are shown in Table 8.

TABLE 10

| | % weed control 17 days after application | |
|---|---|---|
| | Percent Weed control Dosage: 600 g of active substance/ha (4 ltr/ha) | |
| Sample No. | Weed Species: Wild oat 17 DAA | Weed Species: Lamsquarter 17 DAA |
| Sample 5 | 77.5 | 80 |
| Comparative sample | 70 | 75 |

It was thus found that the samples of glufosinate ammonium prepared according to the present invention exhibited good weed control when compared with the comparative sample.

The instant invention is more specifically explained by above examples. However, it should be understood that the scope of the present invention is not limited by the examples in any manner. It will be appreciated by any person skilled in this art that the present invention includes aforesaid examples and further can be modified and altered within the technical scope of the present invention.

The invention claimed is:

1. A stable herbicidal composition comprising:
   (i) glufosinate ammonium salt as an active ingredient in an amount of about 5% to about 50% by weight of the composition;
   (ii) at least one ($C_8$-$C_{20}$)alkyl-dimethylamine N-oxide in an amount of about 8% to about 35 wt % by weight of the composition, wherein the at least one ($C_8$-$C_{20}$)alkyl-dimethylamine N-oxide is selected from the group consisting of decyldimethylamine N-oxide, dodecyldimethylamine N-oxide, and tetradecyldimethylamine N-oxide;
   (iii) ammonium sulfate in an amount of about 1% to about 10% by weight of the composition; and
   (iv) an organic solvent comprising a glycol and an alkoxy aliphatic alcohol, in an amount of about 1% to about 40% by weight of the composition;
   wherein the composition remains clear at a temperature of −5° C. for at least 14 days.

2. The herbicidal composition according to claim 1, wherein the at least one ($C_8$-$C_{20}$)alkyl-dimethylamine N-oxide is dodecyldimethylamine N-oxide.

3. The herbicidal composition according to claim 1, wherein the at least one ($C_8$-$C_{20}$)alkyl-dimethylamine N-oxide is tetradecyldimethylamine N-oxide.

4. The herbicidal composition according to claim 1, wherein the organic solvent is propylene glycol and 1-methoxy-2-propanol.

5. The herbicidal composition according to claim 4, wherein the ratio of the percent, by weight of the composition, of the propylene glycol to the 1-methoxy-2-propanol is about 1.0 to about 2.0.

6. The herbicidal composition according to claim 4, wherein the ratio of the percent, by weight of the composition, of the propylene glycol to the 1-methoxy-2-propanol is about 1.3 to about 1.7.

7. A process for preparing theft herbicidal composition according to claim 1,
   said process comprising mixing the glufosinate ammonium salt in a formulation vessel with water and one of the glycol and the alkoxy aliphatic alcohol followed by the addition of the other of the glycol and the alkoxy aliphatic alcohol, adding a calculated amount of the at least one ($C_8$-$C_{20}$)alkyldimethylamine N-oxide and the ammonium sulfate, followed by homogenizing the resultant mixture to obtain a clear solution.

8. The process according to claim 7, wherein the at least one ($C_8$-$C_{20}$)alkyldimethylamine N-oxide is dodecyldimethylamine N-oxide or tetradecyldimethylamine N-oxide, and the organic solvent is propylene glycol and 1-methoxy-2-propanol.

9. A method of weed control, said method comprising applying to a plant surface the composition according to claim 1.

10. A multi-pack herbicidal product, comprising the compostion of claim 1, the multi-pack herbicidal product comprising:
    a) a first container comprising the glufosinate ammonium salt and the glycol or the alkoxy aliphatic alcohol;
    b) a second container containing the other of the glycol and the alkoxy aliphatic alcohol, the at least one ($C_8$-$C_{20}$)alkyldimethylamine N-oxide, and the ammonium sulfate; and
    c) an instruction manual instructing the user to admix the first and second container ingredients before application.

11. The multi-pack herbicidal product according to claim 10, further comprising a third container, wherein the third container comprises an agrochemical adjuvant, a surfactant, a solvent, or a mixture thereof.

12. The herbicidal composition according to claim 1, thriller comprising glyphosate.

13. The herbicidal composition according to claim 4, wherein the glyphosate is glyphosate isopropyl amine salt.

* * * * *